(12) United States Patent
Pope et al.

(10) Patent No.: US 9,736,283 B2
(45) Date of Patent: Aug. 15, 2017

(54) LIGHT SOURCE WINDOW PAINT

(71) Applicant: Apple Inc., Cupertino, CA (US)

(72) Inventors: Benjamin J. Pope, Sunnyvale, CA (US); Ian A. Spraggs, San Francisco, CA (US); Richard Hung Minh Dinh, Saratoga, CA (US); Rasamy Phouthavong, Campbell, CA (US); Vincent Yan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/278,649

(22) Filed: May 15, 2014

(65) Prior Publication Data

US 2015/0072727 A1   Mar. 12, 2015

Related U.S. Application Data

(60) Provisional application No. 61/875,612, filed on Sep. 9, 2013.

(51) Int. Cl.
| | |
|---|---|
| *H04M 1/00* | (2006.01) |
| *B05D 1/06* | (2006.01) |
| *C08J 7/18* | (2006.01) |
| *C08F 2/46* | (2006.01) |
| *H04M 1/02* | (2006.01) |

(52) U.S. Cl.
CPC .................................. *H04M 1/0264* (2013.01)

(58) Field of Classification Search
CPC .................................................. F21Y 2101/02
USPC ........................ 455/556.1; 427/469, 500, 492
See application file for complete search history.

(56) References Cited

U.S. PATENT DOCUMENTS

| | | | |
|---|---|---|---|
| 5,962,971 A | 10/1999 | Chen | |
| 7,479,662 B2 | 1/2009 | Soules et al. | |
| 8,442,604 B1 * | 5/2013 | Diebel | G03B 17/02 361/679.32 |
| 2002/0079506 A1 | 6/2002 | Komoto et al. | |
| 2011/0315579 A1 * | 12/2011 | Mase | H04M 1/04 206/316.2 |

(Continued)

FOREIGN PATENT DOCUMENTS

| | | |
|---|---|---|
| JP | 2010170973 A | 8/2010 |
| KR | 10-2011-0092756 | 8/2011 |
| KR | 10-2011-0123573 | 11/2011 |

OTHER PUBLICATIONS

International Patent Application PCT/US2014/054834, International Search Report and Written Opinion, Dec. 12, 2014.

(Continued)

*Primary Examiner* — Omoniyi Obayanju
(74) *Attorney, Agent, or Firm* — Downey Brand LLP

(57) ABSTRACT

An electronic device has a camera assembly disposed in a housing of the electronic device that includes a light source assembly having a primary purpose for illuminating a subject during an imaging operation. The light source assembly includes a light source and a light window. A light block can be applied to lateral surfaces of the light window to prevent light passing through the light window from propagating along an outer surface of the housing, or other components of the electronic device. In some embodiments, the light block can include multiple layers having various reflective and absorptive characteristics.

19 Claims, 12 Drawing Sheets

(56) References Cited

U.S. PATENT DOCUMENTS

| | | | | |
|---|---|---|---|---|
| 2012/0099292 A1* | 4/2012 | Yim | ........................ | G09F 13/08 |
| | | | | 362/97.1 |
| 2012/0148225 A1* | 6/2012 | Chow | ................. | H04M 1/0264 |
| | | | | 396/176 |
| 2013/0021793 A1* | 1/2013 | Zimmerman | ............. | F21K 9/54 |
| | | | | 362/231 |
| 2015/0036046 A1* | 2/2015 | Rudmann | ............ | H04N 5/2252 |
| | | | | 348/374 |

OTHER PUBLICATIONS

Japanese Patent Application No. 2016-540932—Office Action dated Apr. 28, 2017.
Korean Patent Application No. 10-2016-7006160—Office Action dated Apr. 27, 2017.

* cited by examiner

LIGHT SOURCE WINDOW PAINT

CROSS-REFERENCE TO RELATED APPLICATION(S)

This application claims the benefit of priority under 35 U.S.C §119(e) to U.S. Provisional Application No. 61/875,612, filed on Sep. 9, 2013, the disclosure of which is incorporated herein by reference in its entirety.

FIELD

The described embodiments relate generally to methods for preventing light leakage of light emitted from a light source along a surface of a translucent device housing.

BACKGROUND

Small form factor electronic devices have become imbued with many functions other than those related to voice communication. These "smartphones" can include image capture devices such as a still or video camera that can be used to capture images that can be used to provide a single snapshot or be processed into a video. In some cases, application developers have been able to use LED flash units associated with the small form factor device camera modules as a robust light source. When housings of these devices are formed of a material that can absorb and reflect light (such as plastic), use of the device as a light source can result in some of the light emitted by the light source propagating along a surface portion of the plastic housing cover and an exterior surface of the small form factor electronic device, providing an undesirable illumination pattern along a rear surface of the small form factor device. Solutions to this problems lead to compromises in aesthetic features of the smartphone.

Therefore, what is desired is a way to prevent or light from creating undesirable illumination patterns along an outside surface of a small for factor electronic device, while maintain an aesthetically desirable look.

SUMMARY

In one aspect, an electronic device having a housing and a light source is described. The electronic device may include a transparent member and a light block. The transparent member may be disposed in an aperture of the housing and may be positioned between the light source and the housing. The transparent member may include a light emission end that allows a first light ray from the light source to exit the transparent member. The light block may be disposed on an outer perimeter of the transparent member, and may also be disposed in the aperture of the housing between the transparent member and the aperture. The electronic device may be configured such that the first light ray received by the outer perimeter of the transparent member is reflected by the light block to the light emission end.

In another aspect, a method of forming a member used to transmit light from a light source disposed in an electronic device and preventing light from passing to other components in the electronic device is described. The method may include providing a sheet that is substantially transparent. The method may further include cutting the sheet to create a first portion and a second portion, with the first portion having a first surface capable of releasing light from the light source. The method may further include applying a light block coating to the first portion. The method may further include cutting the second portion, thereby removing the member from the sheet.

In another aspect, a method of forming a plurality of parts, at least one of which is used in an electronic device is described. The method may include applying a first coating to a substrate. The method may further include machining a portion of the substrate to form a plurality of first portions. The method may further include applying a second coating to the remaining portion of the substrate. The remaining portion may include the plurality of first portions. The method may further include removing a portion of the second coating from the remaining portion the substrate. The method may further include cutting the remaining portion of the substrate to define a plurality of second portions.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
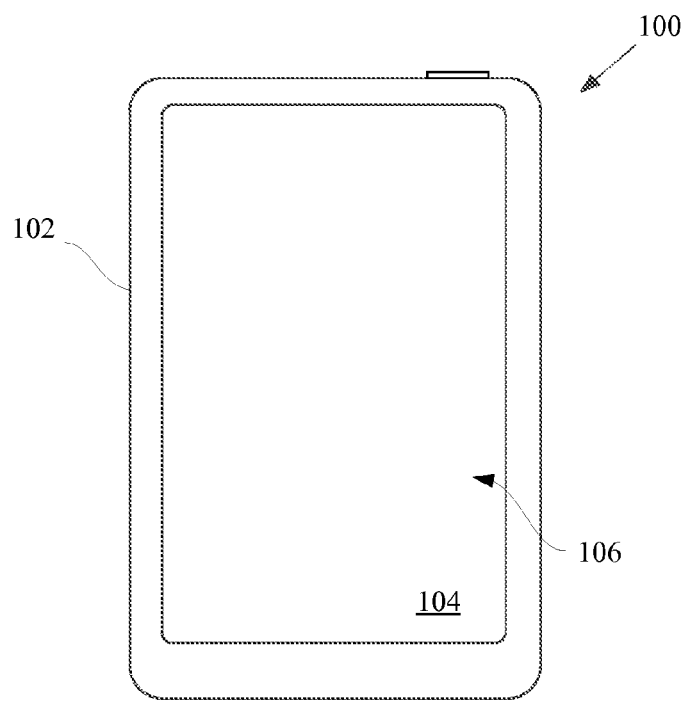
FIGS. 1A and 1B show front and back views of an electronic device having a camera assembly.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Aspects of the described embodiments relate to a small form factor electronic device. For the remainder of this discussion, the small form factor electronic device will be described in terms of a personal media device. The personal media device can include a device housing suitable for enclosing and supporting various operational components. The device housing can support various input/output ("I/O") mechanisms such as volume switches, power buttons, data and power connectors, audio jacks and the like. The housing can include openings to accommodate the I/O mechanisms. The locations at which the input/output mechanisms are placed can be selected to enhance the usability of the interface under conditions for which the device is intended to operate. For instance, for a device intended to be operated with a single hand, the input mechanisms, such as an audio control switch, can be placed at a location that are easily operated by a finger or a thumb while the device is held in the palm of the hand. Other output mechanisms, such as an audio jack, can be placed at locations that do not interfere with holding the device, such as on a top edge or the bottom edge of the device.

The personal media device can include a front facing display and a rear facing camera assembly. The rear camera assembly can include a flash and a lens assembly in close proximity to a light source. In this way, a maximal amount of light generated by the light source can be transmitted to and subsequently be reflected from an object. The reflected light from the object can be captured by lens assembly for image processing by image processing circuitry in the personal media device. In some cases, the front facing display can be used as a viewfinder in that an image of the object can be presented in real time at the front facing display. In this way, an approximation of the composition of the captured imaged can be used to decide whether or not to initiate the image capture process. The image capture process can include initiating a flash sequence in those situations where additional light over and above ambient light may be needed.

The device housing can be provided to protect components within the personal media device. In particular the device housing can be formed of a material that both absorbs and reflects light. In any case, when a light source, such as an LED light configured to emit light through an LED window disposed within one of the holes of the device housing, light from the LED light can spread throughout portions of the device housing that surround the LED window. When the LED light is used as a flash unit, this light dissipation can reduce an amount of light that is transmitted out of the device, thereby limiting an amount of light available for the image capture process. When the LED light is used as a means of continuous illumination, undesirable patterns of light may be generated along an outside surface of the device housing (known as "light leakage"). For example, a portion of the housing surrounding the LED window can show an illuminated halo.

In one embodiment, in order to prevent light leaking across the device housing, at least a portion of the LED window is protected at least in part by a light barrier, or light dam. In this way, the light barrier can reflect or absorb any light before light can be absorbed by or emanate from the device housing, respectively. In some embodiments, the light barrier can be installed along sidewalls of the LED window, thereby preventing light leakage into the device housing. In other embodiments, a portion of the device housing can include a shield preventing light from the LED from entering the device housing. The light barrier itself can have a number of properties that prevent light from passing through it. In some embodiments, the light barrier can be a purely light absorbing layer. In other embodiments, the light barrier can have both reflecting and absorbing properties. For example, the light barrier can include a number of light layers. When the light hits a first light layer of the light barrier a substantial portion of the light can be reflected off the first layer of the light barrier. The portion of light that passes through the first layer can encounter a second layer that is configured to absorb the light. In this way, the two layers can cooperate to reflect and/or absorb substantially all light incident on the light barrier. Also, the amount of light reaching an object can be maximized since the light emitted by the light source can be directed in a more collimated manner thereby increasing an overall amount of light actually illuminating the object to be captured by the image capture process.

These and other embodiments are discussed below with reference to FIGS. 1A-6; however, those skilled in the art will readily appreciate that the detailed description given herein with respect to these figures is for explanatory purposes only and should not be construed as limiting.

Figure 1B:
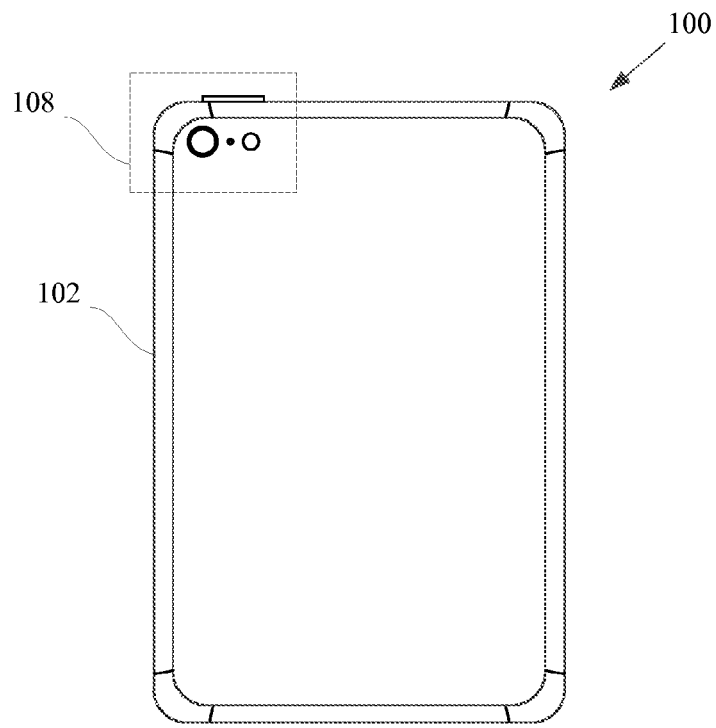

FIGS. 1A and 1B are diagrams showing various views of fully assembled electronic device 100 in accordance with an embodiment of the invention. In particular, FIG. 1A shows a front portion of an electronic device 100. Electronic device 100 can be a personal media device sized for one-handed operations and for placement into small areas such as a pocket, i.e., electronic device 100 can be a handheld pocket sized electronic device. In some embodiments, electronic device 100 may be a music (e.g., MP3) player, game player, video player, personal digital assistant (PDA), or the like. This relatively small form factor allows a user to easily carry the device. In other embodiments, electronic device 100 may be a computer, media device, telecommunication device, or the like. Electronic device 100 is capable of processing data and more particularly media such as imagery, audio and video. Functions generally associate with electronic device 100 may include playing and storing media, wireless communication, transmitting phones calls, text messages, and/or interacting with online content.

Electronic device 100 can include housing 102 configured to at least partially enclose any suitable number of components associated with electronic device 100. For example, housing 102 can enclose and support internally various electrical components (including integrated circuit chips and other circuitry) to provide computing operations for the device. The integrated circuit chips and other circuitry can include a microprocessor, memory, a battery, a circuit board, various I/O support circuitry, or the like. Although not shown in this figure, housing 102 can define a cavity within which the components can be positioned and housing 102 also can physically support any suitable number of mechanisms within housing 102 and/or within openings through a surface of housing 102.

In addition, housing 102 can also define at least in part the outward appearance of electronic device 100. In other words, the shape and form of housing 102 can help define the overall shape and form of electronic device 100, or the contour of housing 102 can embody the outward physical appearance of electronic device 100. Any suitable shape can be used. In some embodiments, the shape includes a slightly curved surface from the front portion of housing 102 to the rear portion of housing 102. In addition, or in other embodiments, housing can include surfaces curved at a relatively large degree. Also, unlike traditional device housings having two parts fastened together at a seam, housing 102 can be integrally formed in such a way as to constitute a single complete unit.

Electronic device 100 also includes display 104 that can be assembled and contained within housing 102. Display 104 can be configured to receive user input events that can have any number of purposes, such as resetting electronic device 100, selecting between display screens presented on display 104, and so on. In one embodiment, cover layer 106 can be a protective top layer of transparent or semitransparent material such that display 104 is still visible. In other words, cover layer 106 serves as a window for display 104. In some embodiments, cover layer 106 is formed from glass (e.g., cover glass), and more particularly highly polished glass. It should be understood that other transparent materials known in the art for covering a visual display for electronic devices can be used (for example, clear plastic).

The viewing region can be touch sensitive. In other words, electronic device 100 may contain circuitry configured to receive touch inputs (or gestures) that help control various aspects shown on display 104. In some embodiments, the touch inputs can be simultaneously received (e.g., multi-touch). In these embodiments, a touch sensing layer (not shown) can be positioned below cover layer 106. In some embodiments, the touch sensing layer can be disposed between cover layer 106 and display 104. In other embodiments, the touch sensing layer is position on a top (front) surface of display 104. Attaching means for touch sensing layer include printing, depositing, laminating, or other bonding techniques generally known. The touch sensing layer generally includes a plurality of sensors configured to activate as a finger touches the upper surface of the cover layer 106 (or several fingers in the case of multi-touch). In the simplest case, an electrical signal is produced each time the finger passes a sensor. The number of signals in a given time frame can indicate location, direction, speed and acceleration of the finger on the touch sensitive portion. In most cases, the signals are monitored by an electronic interface that converts the signal into a number, combination and frequency. This information can then be used by the electronic device 100 to perform the desired control function relative to display 104.

FIG. 1B shows a rear portion of electronic device 100 in accordance with the described embodiments. Located on the rear side within region 108 (shown in FIG. 2) can be found various components of a camera assembly. The camera assembly can include a number of apertures that allow various sensors and illumination elements disposed within housing 102 to emit light and record data from outside housing 102.

Figure 2:
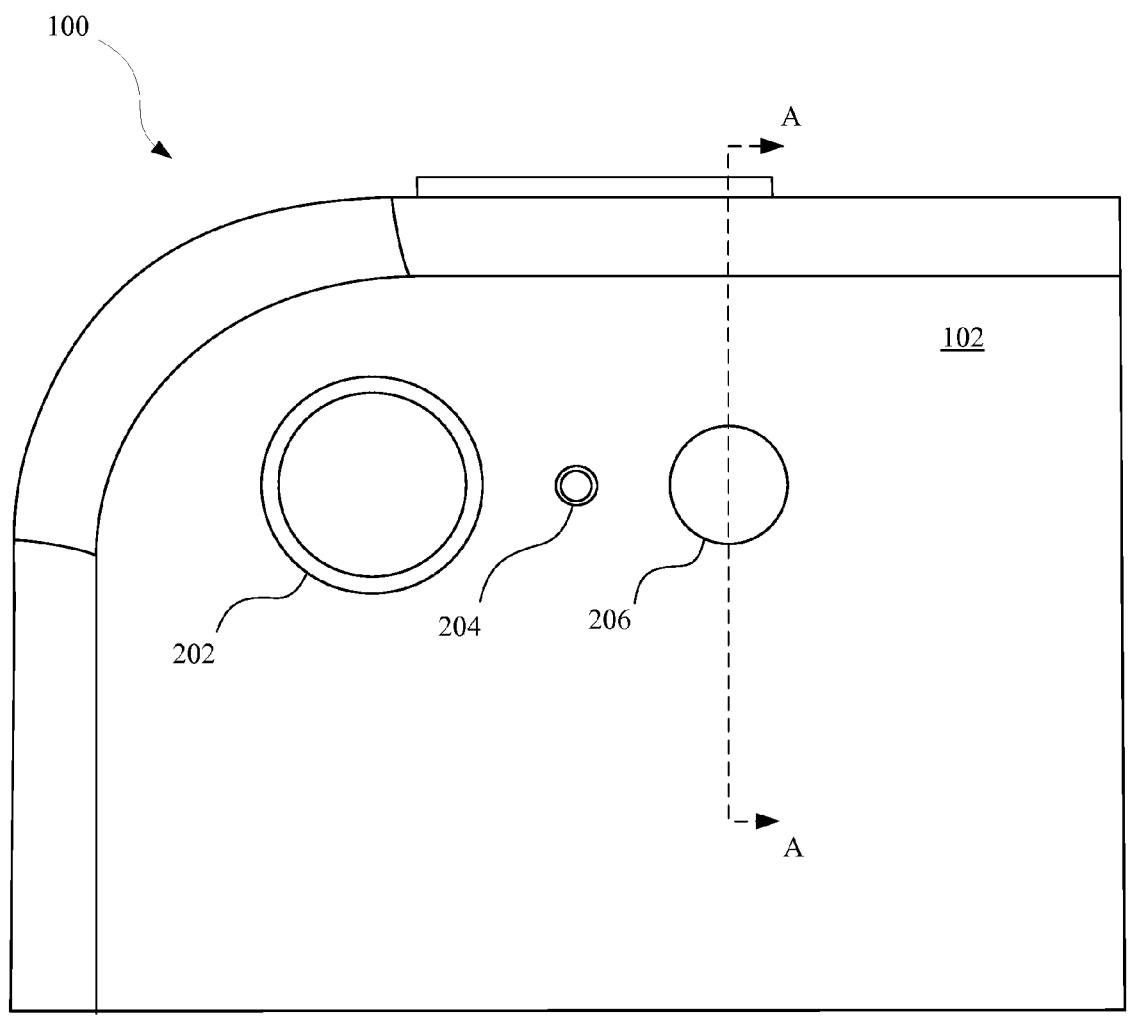
FIG. 2 shows a close up view of the camera assembly of the electronic device of FIG. 1B.

FIG. 2 shows a partial top view of a rear portion of electronic device 100 in accordance with region 108 of FIG. 1B. Electronic device 100 can include a number of audio/video components within personal media device housing 102. As discussed above housing 102 can be a housing having properties that allow it to absorb and transmit or reflect light. Camera opening 202 can correspond to a camera module disposed within housing 102. In some embodiments, an interface between camera opening 202 and the camera module aligned with camera opening 202 can include a light blocking member disposed about a perimeter of camera opening 202. The light blocking member prevents stray light emitted from other components within electronic device 100 from entering into an image gathering portion of the camera module. Electronic device 100 can further include a microphone opening 204. Microphone opening 204 can correspond to a microphone within electronic device 100. Microphone opening 204 allows microphone to receive audio from subjects positioned proximate to electronic device 100. Electronic device 100 can further include an LED light opening 206. LED light opening 206 can be operative to provide a path through which an LED light can illuminate a subject viewable by the camera module of electronic device 100. Due to the LED light being close proximity to camera opening 202, a substantial portion of light emitted from LED light opening 206 can reflected back from an external object, and pass into camera opening 202. In this way, LED light opening 206 can contribute to enhancing a photograph.

Figure 3:
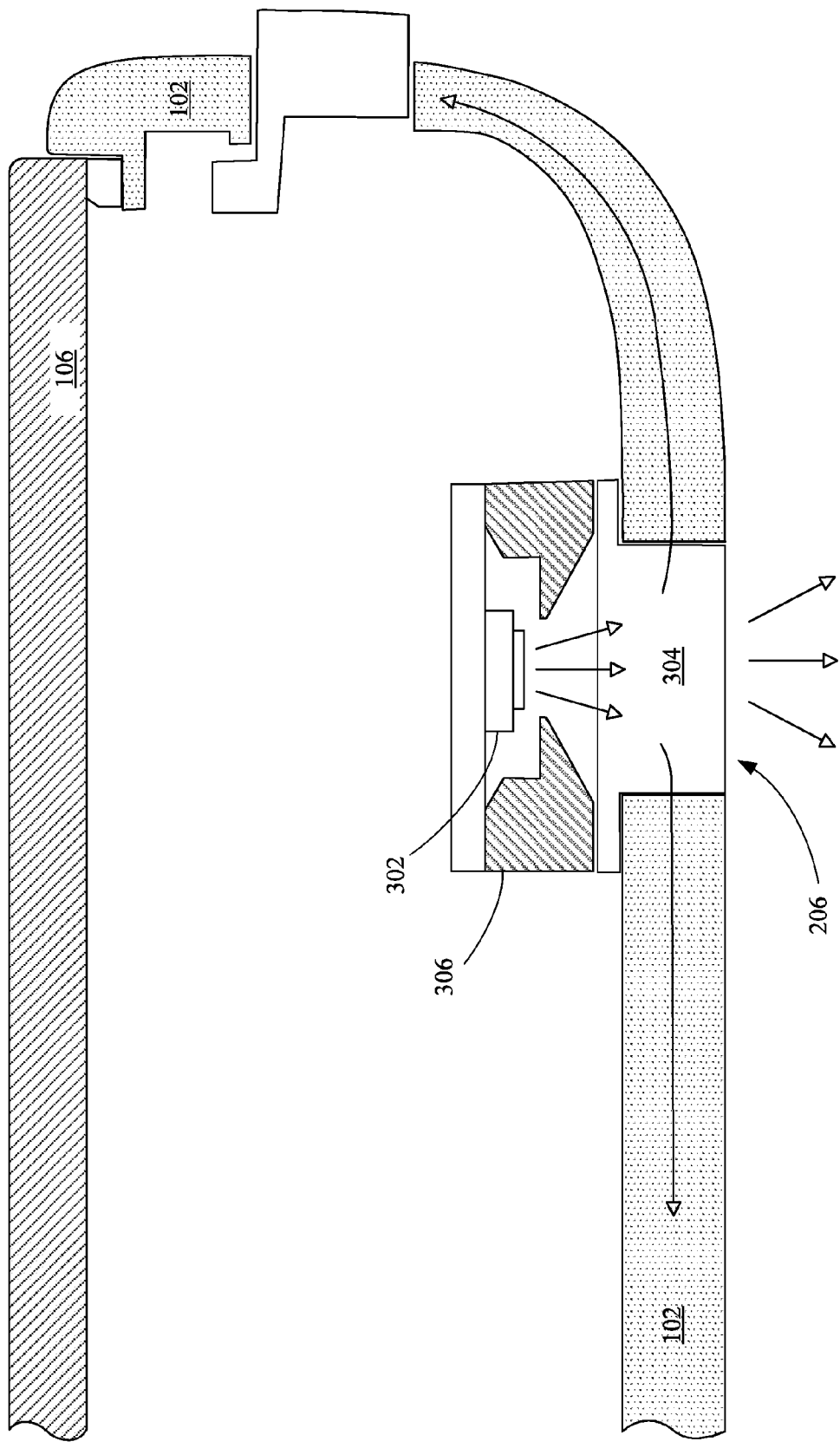
FIG. 3 shows a cross-sectional side view of the electronic device of FIG. 2 in accordance with a cross-section defined in FIG. 2.

FIG. 3 shows a cross-sectional side view of a portion of an inside of electronic device 100 as indicated by cross-section A-A of FIG. 2. For purposes of clarity, several internal components of electronic device 100, as well as camera opening 202 and microphone opening 204, have been removed to allow for a clearer focus on an LED light assembly. In this illustration LED light 302 is depicted emitting light through LED window 304. LED window 304 is disposed within LED light opening 206 of housing 102. As light leaves LED light 302 it pass through reflector 306 at which point it travels through LED window 304 and, as shown by arrows representing emitted light rays, most of the light emitted through LED window 304 leaves housing 102 of electronic device 100. However, when an inside surface of LED light opening 206 absorbs the LED light, the absorbed light is propagated along/within housing 102.

Figure 4A:
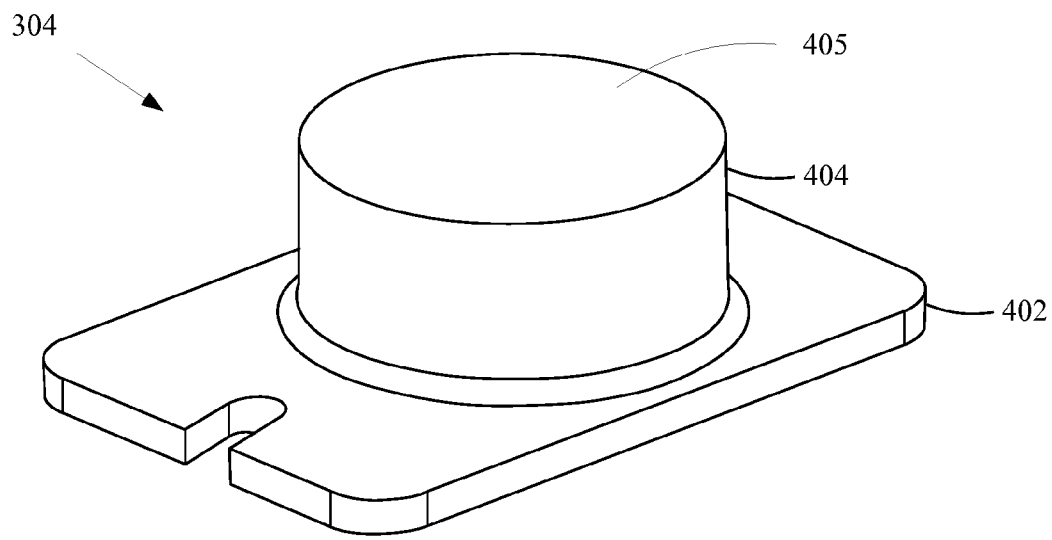
FIGS. 4A and 4B show perspective views of an LED light window.
Figure 4B:
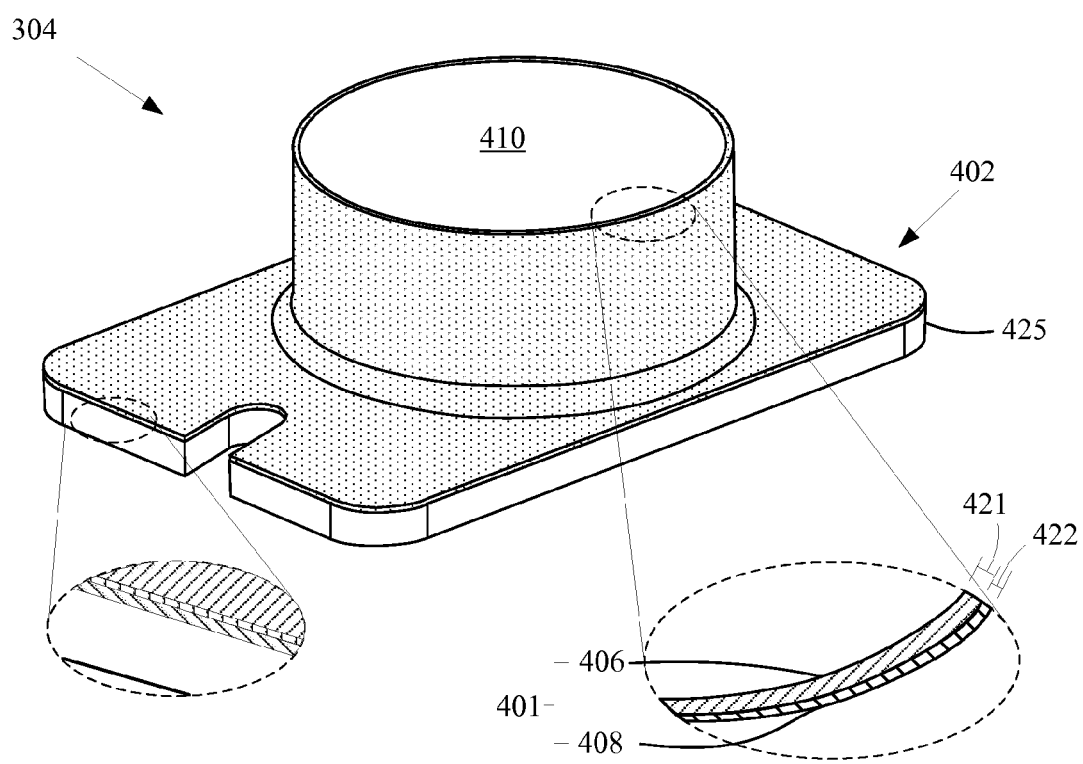

FIGS. 4A-4B show various perspective views of LED window 304. FIG. 4A shows LED window 304 without any reflective enhancements. LED window 304 generally includes a cylindrical portion 404 and a base portion 402. Base portion 402 is generally a flanged portion configured to be received and secured by electronic device 100. LED window 304 can be made from many different translucent materials that do not substantially attenuate light passing through the material. In some embodiments, LED window 304 can be made of an acrylic such as polymethyl methacrylate (PMMA) that provides acceptable optical properties while also being resistant to breaking and/or cracking. Also, a machining operation can be used to produce several LED windows 304 from a single sheet of material having a uniform thickness. The machining operation may include a computer numeric control (CNC) mill. The thickness of the single sheet is generally of the same thickness as the LED window 304. In other words, the single sheet has a thickness measuring approximately from a top surface 405 of LED window 304 to a bottom surface of base portion 402 of LED window 304.

FIG. 4B illustrates LED window 304 having first layer 406 and second layer 408 on an outside portion of LED window 304, forming a light block 401. In other embodiments, three or more layers may be applied to LED window 304 to form a light block. First layer 406 and second layer 408 generally have different optical properties. First layer 406 may be made from paint, ink, or another deposited material configured to interact with light. First layer 406 can be a coated material generally configured to reflect light. The process for coating may include printing, physical vapor deposition (PVD), chemical vapor deposition (CVD), or a combination thereof. In the embodiment shown in FIG. 4B, first layer 406 is spray-coated, or spray-deposited, onto LED window 304. In some embodiments, first layer 406 can be a color capable of reflecting light (for example, silver). In the embodiment shown in FIG. 4B, first layer 406 is white. The white attribute contributes to lateral light leaking (light leaving the curved surface of cylindrical portion 404) being reflected back into LED window 304, thereby preventing emitted LED light from entering other portions of electronic device 100 (for example, housing 102). In other embodiments, however, first layer 406 can be of a color that matches an outside surface color of housing 102 or to have any other desirable reflective or cosmetic attributes. In this manner, first layer 406 can have an appearance of continuity with housing 102.

After first layer 406 is applied, second layer 408 is applied over and onto first layer 406. Second layer 408 is generally configured to absorb light, and is made of a color darker than that of first layer 406. Further, second layer 408 is generally an opaque layer configured to absorb light passed through first layer 406. Light absorbed from second layer 408 does not pass through second layer 408. Accordingly, other components within electronic device 100 do not receive light from LED light 302. Also, second layer 408 may absorb light emitted from other components within electronic device 100. Second layer 408 may be of any material described for first layer 406, and may be coated or deposited onto LED window 304 by any means described for the coating/depositing process of first layer 406.

In some embodiments, first layer 406 has a thickness substantially similar to that of second layer 408. In other embodiments, second layer 408 may have a greater thickness than first layer 406. In the embodiment shown in FIG. 4B, first layer 406 has a first thickness 421 of approximately 20 microns and second layer 408 has a second thickness 422 of approximately 10 microns. Also, in some embodiments, the coating process for first layer 406 and second layer 408 is such that first layer 406 and second layer 408 generally have a uniform thickness. In other embodiments, first layer 406 and/or second layer 408 may have a varying thickness. For example, second layer 408 may have second thickness 422 near a top surface (for example, proximate to masked portion 410) but a different thickness in a direction extending toward base portion 402. In some embodiments, this differing thickness could be greater than second thickness 422. In other embodiments, differing thickness could be less than second thickness 422. Also, in some embodiments, base portion 402 may not include first layer 406 and/or second layer 408. In the embodiment shown in FIG. 4B, base portion 402 includes first layer 406 and second layer 408.

The combination of light reflecting/absorbing layers can keep substantially all light from escaping LED window 304 in an undesired direction such that LED light escapes only through emitting portion 410. Emitting portion 410 of LED window 304 can be masked by a masking member (not shown) during the coating process of first layer 406 and second layer 408. The masking member is then removed leaving emitting portion 410 free of any light block material and capable of emitting light throughout the entire surface of emitting portion 410. Base portion 402 includes lateral surface 425 that may not include any light-blocking layers. This may be due to a user preference or the manufacturing process. Regarding the latter, because lateral surface 425 is not formed until LED window 304 is cut and removed from the sheet, and because LED window 304 may be coated prior to the cutting and removing process, lateral surface 425 is not exposed to any coating. Accordingly, neither first layer 406 nor second layer 408 can be applied to lateral surface 425. However, in other embodiments where light leakage at lateral surface 425 may be a concern, lateral surface 425 can be coated by the coating process subsequent to the machining operation.

It should be noted that although first layer 406 may be made of a substantially white material, the color of first layer 406 can also match an outside surface color of housing 102. In this way, first layer 406 can have an appearance of continuity with the housing. In other embodiments, first layer 406 can be of a color to achieve any other desirable reflective or cosmetic attributes. Conversely, although second layer 408 may be made of a substantially black material, the color of second layer 408 can also be of a color to achieve any other desirable absorption or cosmetic attributes.

While the embodiments described include first layer 406 having reflective properties and second layer 408 having absorption properties, the properties could be reversed in other embodiments to achieve a certain desired effect. For example, first layer 406 could include absorption properties as described for a light-absorbing layer. Also, second layer 408 could include reflective properties as described for a light-reflecting layer.

Figure 5A:
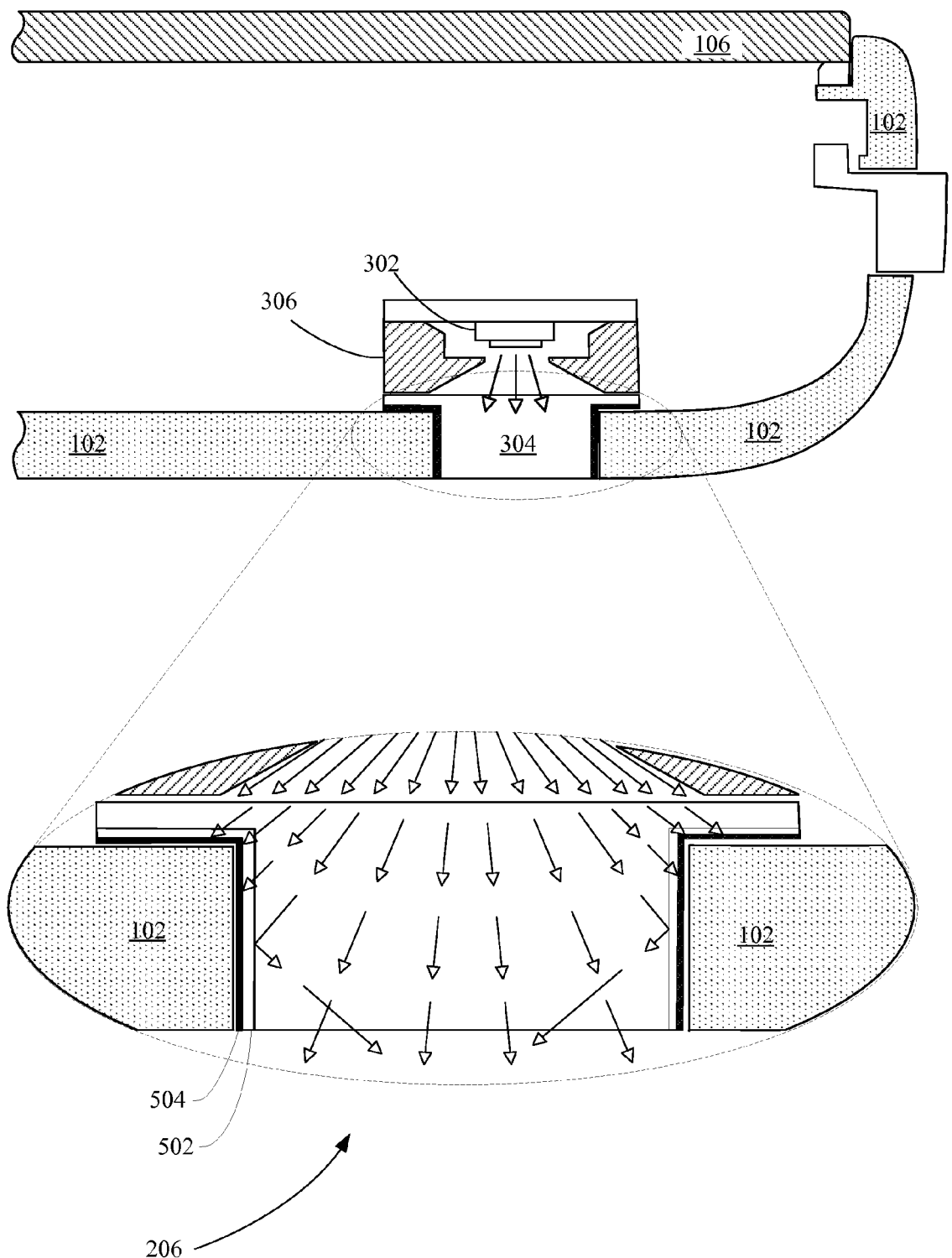
FIG. 5A shows a cross-sectional view of the electronic device of FIG. 2 having an LED light window with a light block.

FIG. 5A illustrates a cross-sectional side view of electronic device 100 as defined by cross-section A-A of FIG. 2, with light block having first layer 502 and second layer 504. Emitted light rays (arrows) show light being reflected and absorbed by first layer 502 and second layer 504. Depending on an angle of incidence between light emitted from LED light 302 and first layer 502, emitted light may either be reflected by first layer 502 or absorbed through first layer 502. When the emitted light is reflected by first layer 502, it is escapes electronic device 100 through LED opening 206. Emitted light rays passing through LED opening 206 combine with other lights rays, thereby increasing the intensity of light emitted from electronic device 100. Light absorbed through first layer 502 is then absorbed by second layer 504 configured to absorb substantially all light incident upon a surface of layer 504. It should be noted that in some embodiments, depending on a thickness and opacity of the light block, a small amount of light can leak through the light block. In those embodiments, a camera module (not shown) can also include a window that has a light block. This can prevent any minimal amount of light transmitted through housing 102 or from other internal light emitting components from degrading an image captured by the camera module. It should be further noted that in another embodiment, the light block can be applied onto a portion about the opening in which LED window 304 sits. In such an embodiment, the light block on the housing can cooperate with or function independently to prevent light from entering housing 102.

Figure 5B:
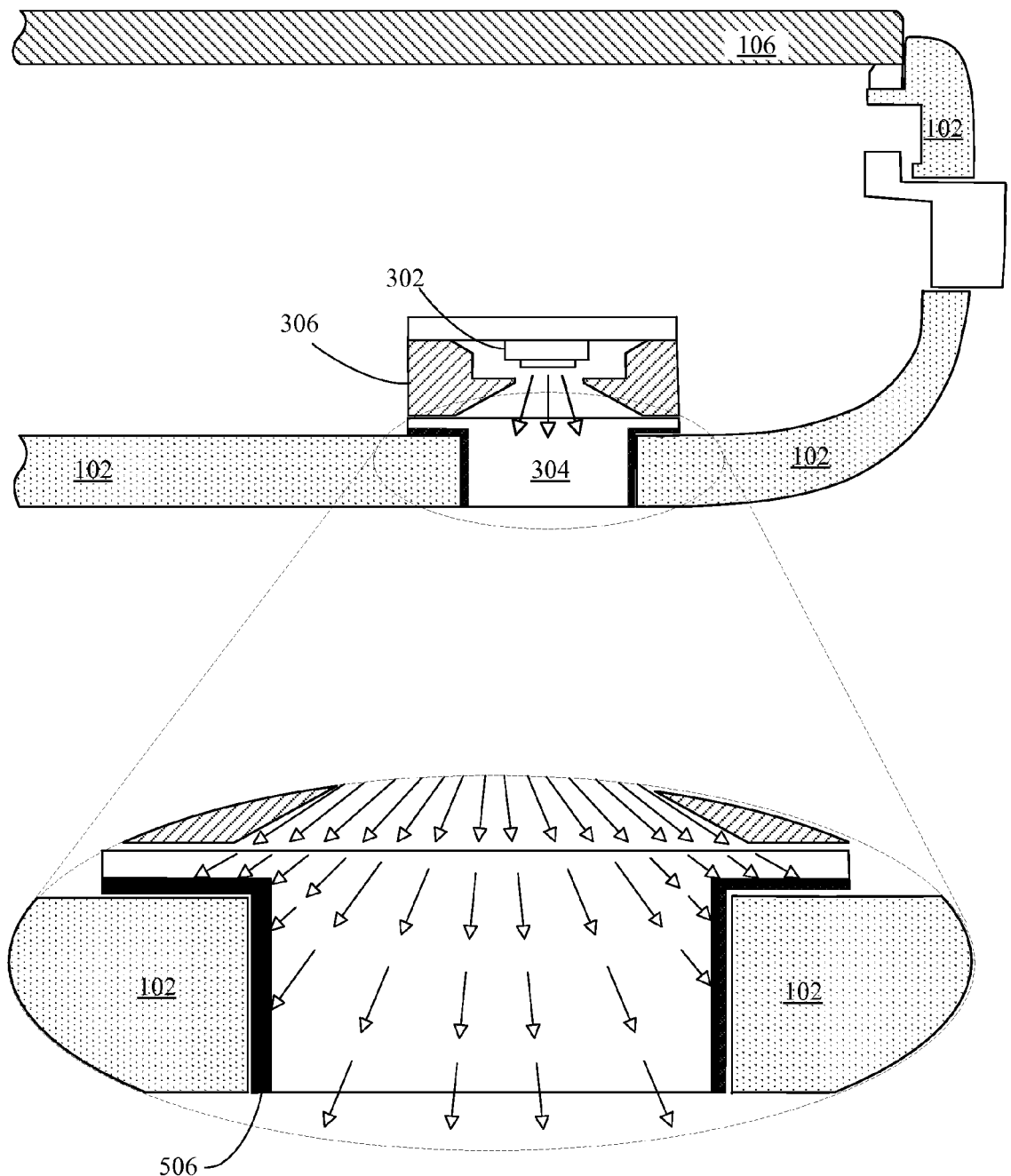
FIG. 5B shows a cross-sectional view of the electronic device of FIG. 2 having an LED light window with an alternative light block.

FIG. 5B is an alternative embodiment of electronic device 100 a cross-sectional side view as defined by cross-section A-A of FIG. 2. In particular, the light block has an alternate configuration. In this embodiment, the light block 506 includes only a single layer. Light block 506 can be an absorbing layer and can have an advantage of providing a light block having greater opacity (as compared to first layer 502 and second layer 504), given a greater thickness of light block 506. In embodiments where light block 506 does not interfere with cosmetics of housing 102, an additional light layer proximate to housing 102 is not required.

Figure 6:
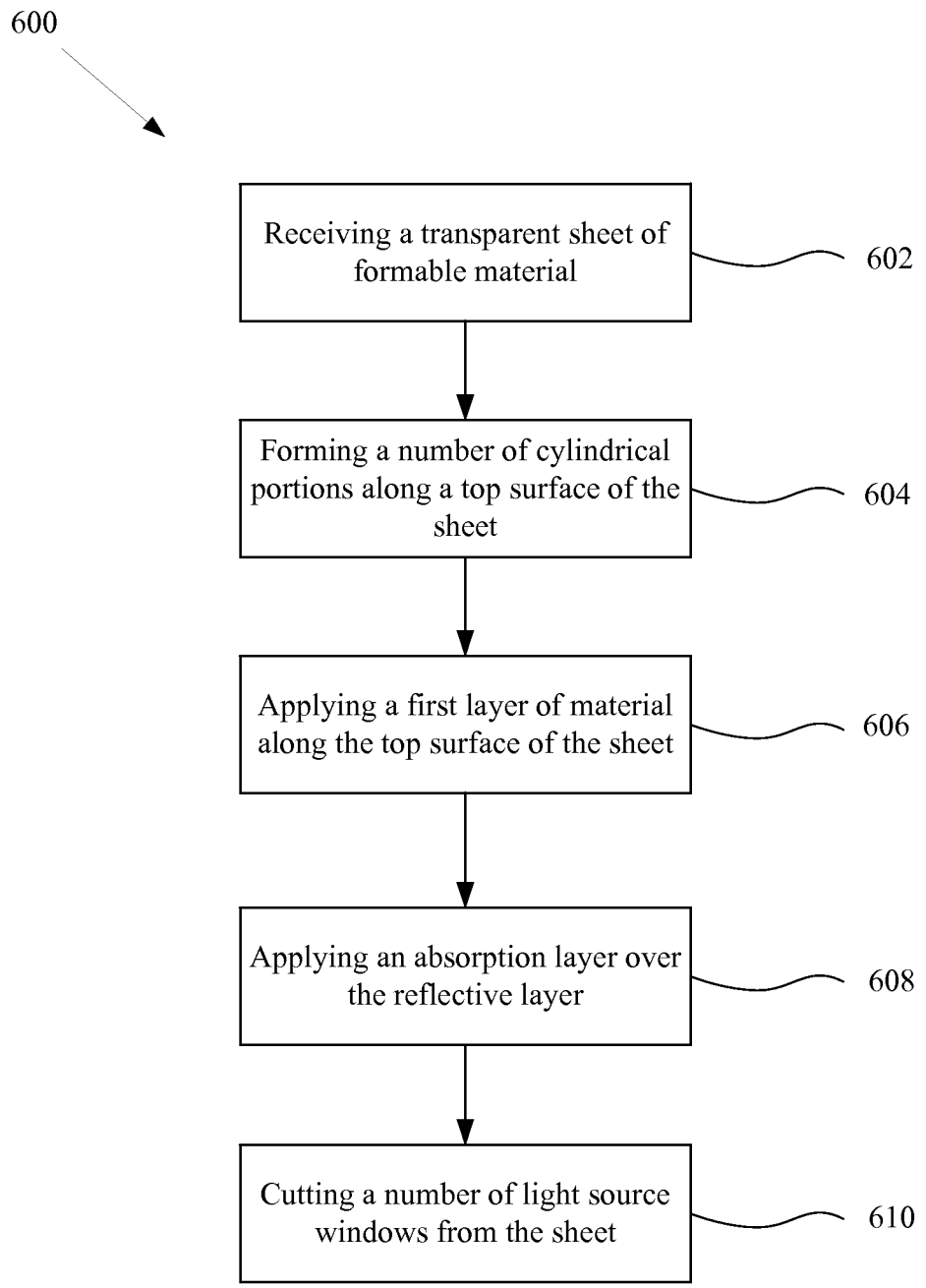
FIG. 6 shows a block diagram illustrating a method for manufacturing a light window having a light block.

FIG. 6 shows a block diagram illustrating a method 600 for creating a light source window including a light block. In a first step 602, a sheet of transparent, formable material is obtained. At step 604, a machining process forms a number of cylindrical portions each having a base portion disposed below (each cylindrical portion). Subsequent to step 604, a top end of each of the cylindrical extrusions can be masked. At step 606, a first can be applied to the transparent sheet. In some embodiments, the first layer may be configured to reflect light that contacts first layer. At step 608, a second layer can be applied over the first layer. In some embodiments, the second layer may be configured to absorb light that contacts second layer. At step 610, the sheet is cut into individual light source windows, at which point the light source windows can be installed in a personal media device. Light source window can include a LED window.

Other methods of forming light source windows and applying a light block are available. For example, FIGS. 7-12 illustrate a method of making several light source windows from a single substrate.

Figure 7:
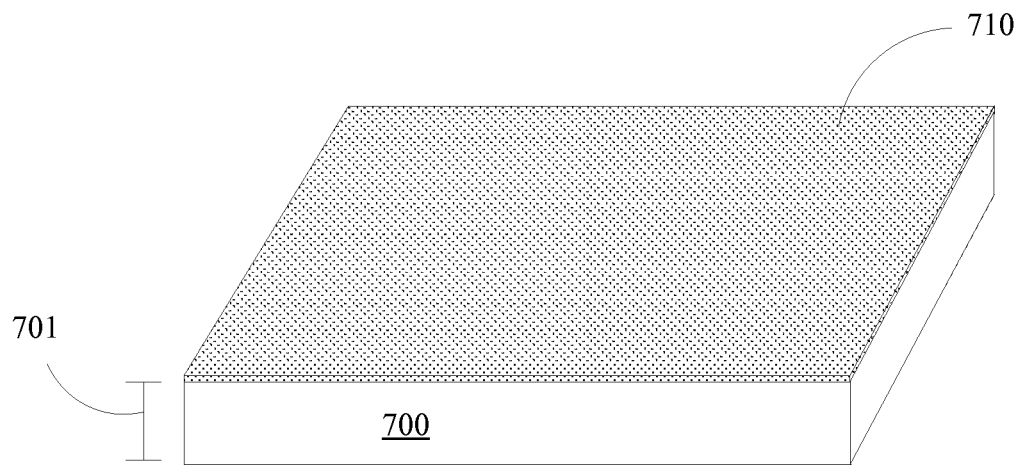
FIG. 7 shows an embodiment of a substrate having a first coating.

FIG. 7 illustrates substrate 700 having a first coating 710 that is generally uniformly disposed on substrate 700. In some embodiments, substrate 700 is made from a material such as sapphire, glass, or polymeric materials. In the embodiment shown in FIG. 7, substrate 700 is a sheet of polymethyl methacrylate ("PMMA"). Generally, substrate 700 is made from a solid transparent material, or materials, generally known in the art for allowing light to pass through the material or materials. Also, substrate 700 is generally of a thickness 701 corresponding to a height of a structure to be formed from substrate 700 (such as a light source window). In other words, in other embodiments, thickness 701 could be larger or smaller in order to achieve a desired shape.

In some embodiments, first coating 710 is an ink layer. In other embodiments, first coating 710 is a printed layer. Still, in other embodiments, first coating 710 is applied by PVD, CVD, sputtering, or in a non-contact vacuum (in order to apply a metalized layer). In the embodiment shown in FIG. 7, first coating 710 is spray painted onto substrate 700. Also, first coating 710 includes oleophobic properties such that first coating 710 resists permanent adhesion to layers, coatings, etc. disposed over first coating 710. The term "oleophobic" as used in the detailed description and in the claims refers to lack of adhesion or affinity to structures. In this manner, the layers or coatings disposed over first coating 710 may be easily removed. This will be discussed in further detail below. Also, in the embodiment shown in FIG. 7, first coating 710 is configured to allow light to pass through first coating 710 such that light reaches substrate 700. In other embodiments, first coating 710 is configured to block light form pass through first coating 710. While first coating 710 includes oleophobic properties to resist adhesion, a bottom portion of first coating 710 may be sufficiently attached to portions of substrate 700 such that first coating 710 may be removed only when desired. Also, first coating 710 may include a fluorine-based material to create and/or enhance the oleophobic properties of first coating 710.

Figure 8:
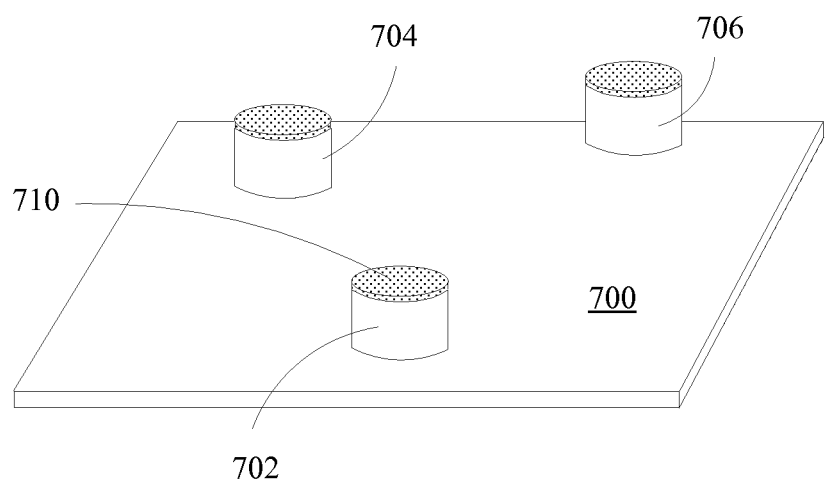
FIG. 8 shows the embodiment of the substrate in FIG. 7 having undergone a machining process.

After first coating 710 is applied, substrate 700 may be machined to remove portions of substrate 700. FIG. 8 shows substrate 700 having certain portions of substrate 700 removed. The removal process for substrate 700 may include machining (including ultrasonic or laser machining), grinding, or electrical discharge machining ("EDM"). In the embodiment shown in FIG. 8, substrate 700 is machined in a CNC mill. Also, as shown in FIG. 8, portions of substrate 700 have been removed leaving several first portions. First portions, shown as first protrusion 702, second protrusion 704, and third protrusion 706, represent the remaining (net) portions that form a portion of structures such as the LED window previously described. In some embodiments, first protrusion 702, second protrusion 704, and third protrusion 706 include an outer peripheral portion having three or more sides. In the embodiment shown in FIG. 8, first protrusion 702, second protrusion 704, and third protrusion 706 are generally cylindrical. Also, although first protrusion 702, second protrusion 704, and third protrusion 706 are shown, FIG. 8 is intended to be exemplary in that several additional protrusions could be formed from substrate 700. Also, FIG. 8 shows the machining process removing first coating 710 from substrate 700 except for top portions of first protrusion 702, second protrusion 704, and third protrusion 706.

Figure 9:
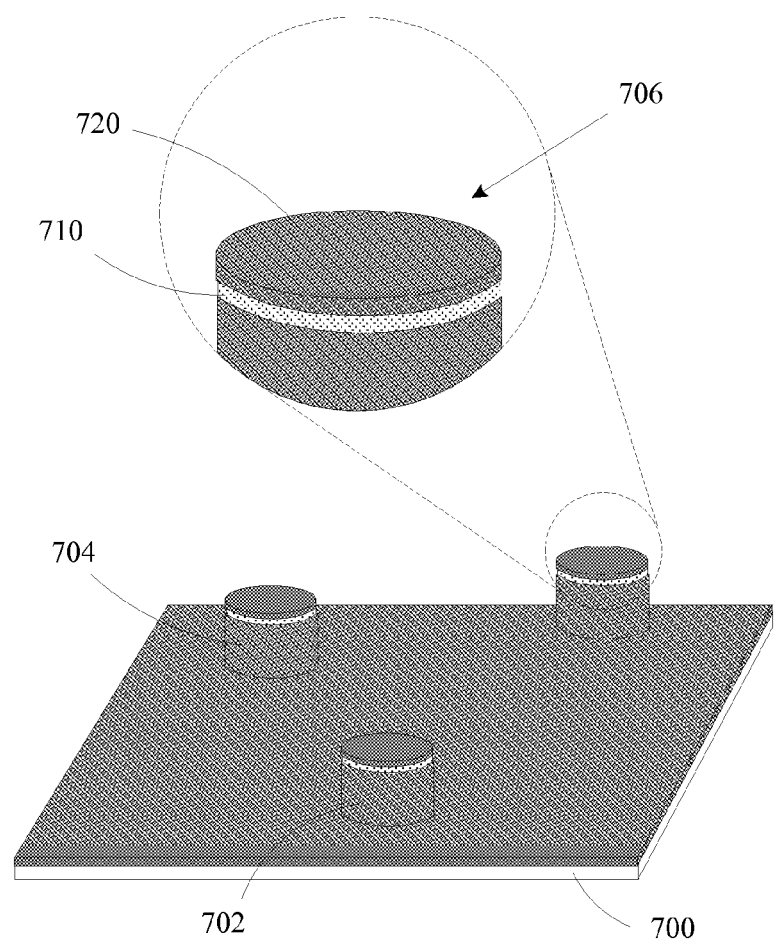
FIG. 9 shows the embodiment in FIG. 8 with a second coating applied.

After machining the substrate to form desired structures, a second coating may be applied to the substrate and the protrusions. FIG. 9 shows second coating 720 applied to substrate 700, first protrusion 702, second protrusion 704, and third protrusion 706. Also, the enlarged view in FIG. 9 shows second coating 720 disposed over first coating 710. For illustrative purposes, first coating 710 is shown in FIG. 9, although first coating 710 is generally not viewable until later steps (described below). Second coating 720 may be applied in any way previously described for first coating 710. Also, similar to first coating 710, second coating 720 is a generally uniform coating.

Second coating 720 may serve several purposes. For example, second coating 720 may be made of a substance (e.g., ink, paint, or polymeric material) configured to block light from passing through second coating 720. Also, second coating 720 may further be configured to provide a desired aesthetic appeal. For example, second coating 720 may include several colors such as red, blue, green, yellow, or a combination thereof. In some embodiments, a third coating (not shown) is applied over second coating to further block light and/or provide a desired aesthetic appeal. In other embodiments, a fourth coating (not shown) is applied over the third coating which may offer similar functionality as that of the third coating. Also, in some embodiments, the coatings disposed above first coating 710 may be cured. Curing means may include heating the coatings in an oven, or UV curing. This allows the coatings to be properly disposed over first coating 710 and/or enhance the effects or functionality of the coatings. In other embodiments, a curing process is not required.

Figure 10:
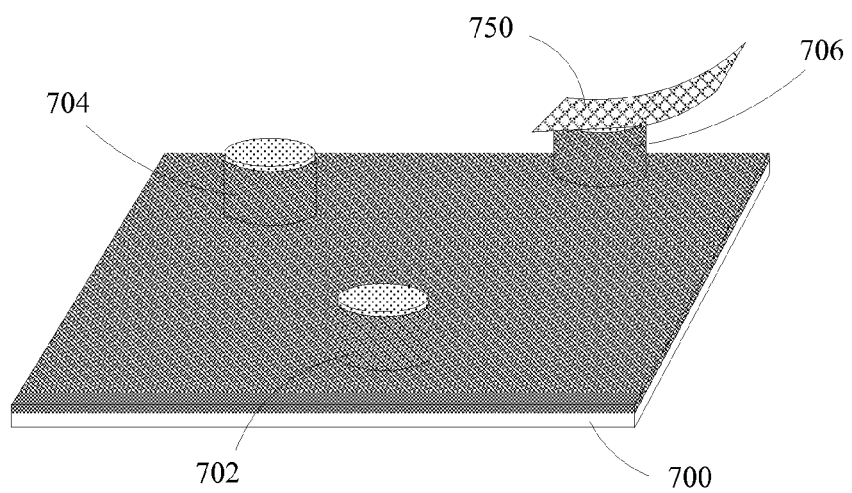
FIG. 10 shows the embodiment in FIG. 9 with an adhesive layer used to remove portions of the second coating from the substrate.

In order to allow light to pass through structures (or protrusions) formed on the substrate, second coating 720 (and other coatings disposed over second coating 720) should be removed. FIG. 10 shows first protrusion 702 and second protrusion 704 having only first coating 710 on a top portion of first protrusion 702 and second protrusion 704. Due to the oleophobic properties of first coating 710, second coating 720 may be easily removed from the top portions of first protrusion 702, second protrusion 704, and third protrusion 706. In some embodiments, a chemical wash may be used to remove second coating 720. In the embodiment shown in FIG. 10, adhesion layer 750 is used. Adhesion layer 750 may be a high adhesion tape configured to peel off second coating 720 (or any coating over second coating 720) without damaging the underlying surface and/or without removing first coating 710. As shown, adhesion layer 750 is part of a mechanical process to remove second coating 720 from a top portion of third protrusion 706 in a manner similar to first protrusion 702 and second protrusion 704. Also, in some embodiments where curing is not required, second coating 720 may be removed by a wiping process. Generally, the removal process (of coatings above first coating 710) is tailored to the coating(s) selected.

FIG. 10 further shows second coating 720 remaining an outer peripheral portion of first protrusion 702, second protrusion 704, and third protrusion 706, as well as on a top surface of substrate 700. Because the (previous) machining process removed first coating 710, second coating 720 remains on portions of substrate 700 and the protrusions where first coating 710 was removed. This allows substrate 700 to be selectively coated with a desired coating or coatings. Alternatively, substrate 700 may be view as having portions with coatings selectively removed.

Figure 11:
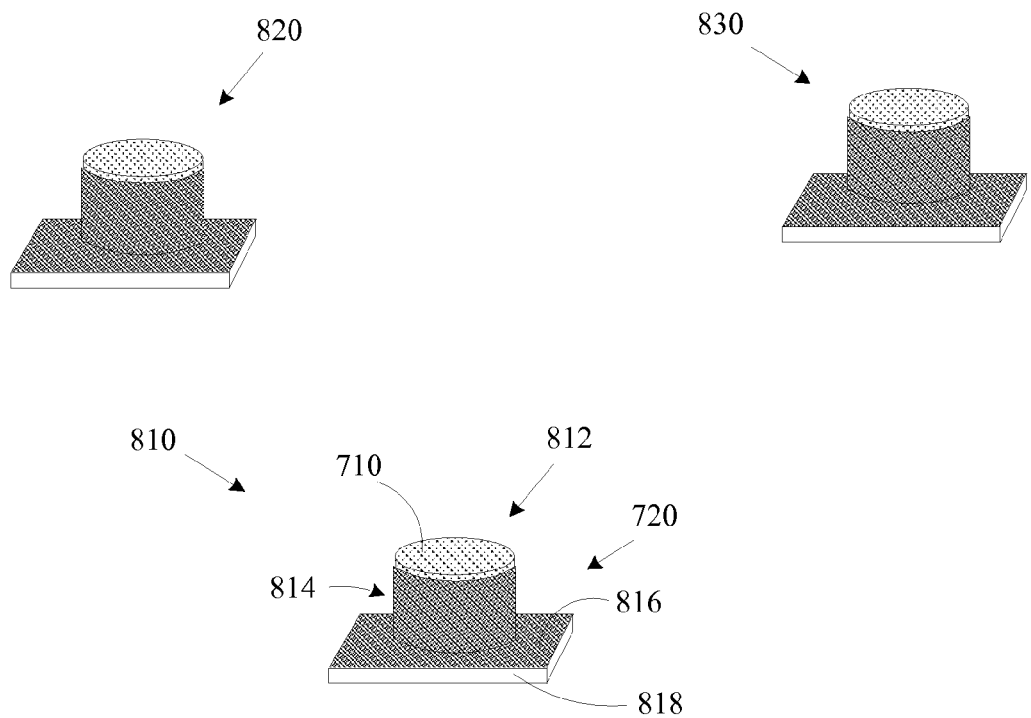
FIG. 11 shows an embodiment of an LED window may be cutting the substrate shown in FIG. 10.
Figure 12:
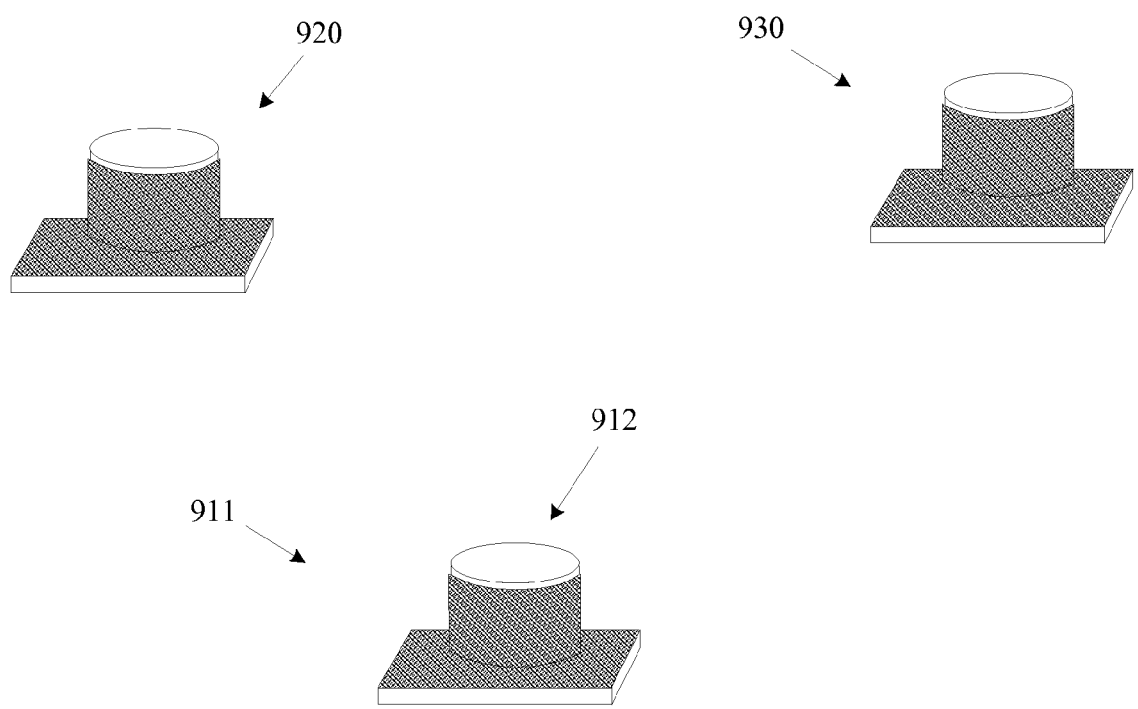
FIG. 12 shows an embodiment of an LED with the first coating removed from a top portion of the LED window.

After the desired coatings are removed, a singulation process may be performed to cut or dice the substrate into a desired shape. The term "singulation" as used in this detailed description and in the claims refers cutting parts from a substrate to form several singular parts. As shown in FIGS. 11 and 12, the substrate is diced such that a generally rectangular base portion remains around the protrusions. However, in other embodiments, the substrate may be diced in a different manner to form a base portion having, for example, a rounded shape. In some embodiments, the singulation process includes cutting the substrate with a saw. In other embodiments, the singulation process includes machining the substrate in a mill. In the embodiments shown in FIGS. 11 and 12, the singulation process includes a laser micro-machining process. FIG. 11 shows the LED windows having the previously described coatings on an outer peripheral portion and a base portion. For example, first LED window 810 includes first coating 710 on top portion 812 and second coating 720 on outer peripheral portion 814 and base portion 816. In some embodiments (not shown), an additional second coating 720 may be disposed to the lateral portions of base portion 816 (such as first lateral portion 818). Second LED window 820 and third LED window 830 have similar configurations to those of first LED window 810.

In some embodiments, it may be advantageous to remove the first coating and expose to top portion of the LED window to the environment. FIG. 12 illustrates the LED windows with the first coating removed from the top portions of the LED windows. For example, first LED window 911 is substantially similar to first LED window 810 (in FIG. 11) except for the first coating is removed from top portion 912. Second LED window 920 and third LED window 930 have similar configurations to those of first LED window 911.

The process described in FIGS. 7-12 allow for an array of parts to be formed and coated in a relatively simple process rather than cutting and coating individual parts. This leads to improved manufacturing times as well as improved handling of the parts.

Figure 13:
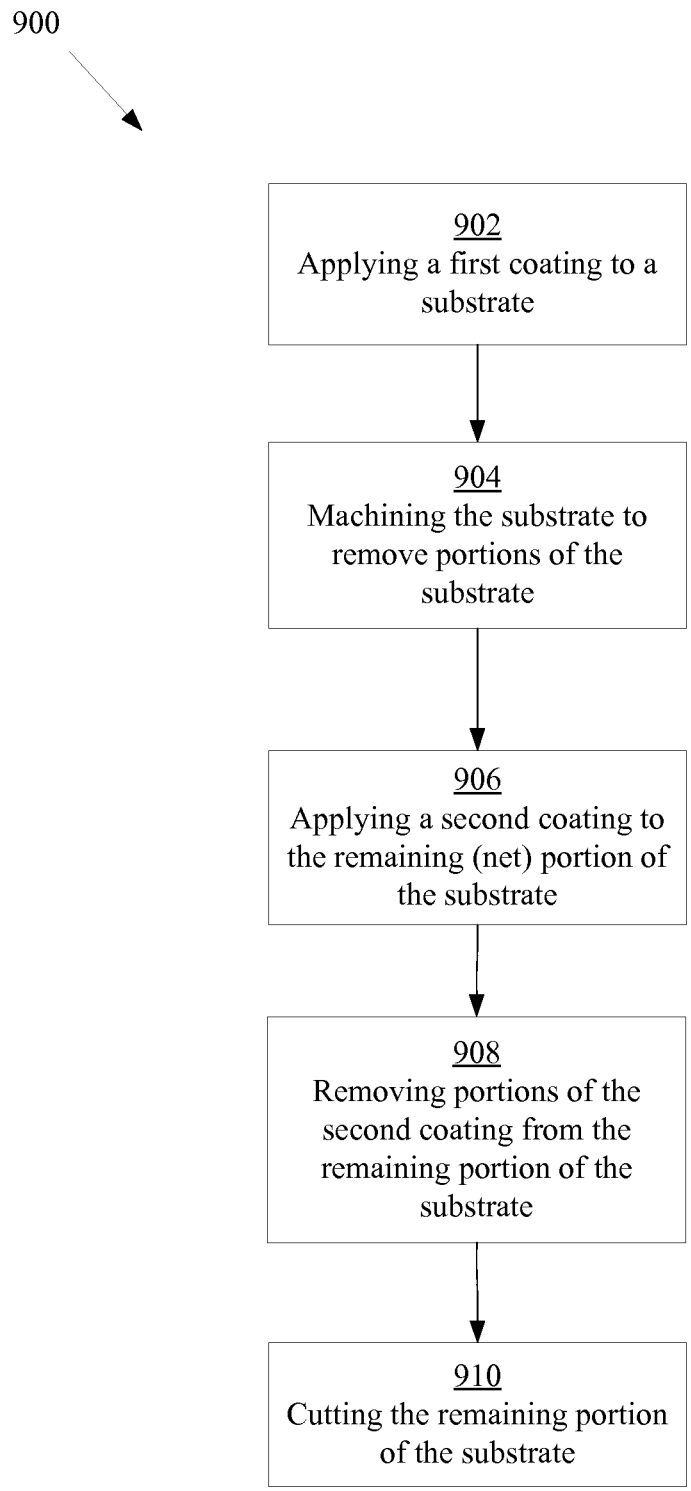
FIG. 13 shows a flowchart describing a method of making a plurality of parts used in an electronic device, in accordance with described embodiments.

FIG. 13 illustrates a flowchart 900 describing a method of making a plurality of parts used in an electronic device. In step 902, a substrate is coated with a first coating. The substrate and the first coating may be any substrate and any first coating, respectively, previously described. Further, the first coating may be applied in any manner previously described. Then in step 904, the substrate is machined to remove portions of the substrate. The substrate may be machined to define a plurality of first portions (of the parts). Also, the machining step may remove at least some of the first coating. Then in step 906, a second coating is applied to the remaining (net) portion of the substrate. The second coating may be any coating previously described, and may be applied in any manner previously described. Also, the second coating may be cured by curing means previously described. In some embodiments, a third coating may be applied over the second coating. In other embodiments, a fourth coating may be further applied over the third coating. Then in step 908, the second coating is removed from certain portions of the remaining portion of the substrate. The removal process may be performed through means previously described. In some embodiment, the second coating is adhesively attached to the remaining portion of the substrate, particularly in areas where the first coating was removed during the machining process. Then in step 910, a cutting process is applied to the remaining portion of the substrate in desired areas. The cutting process may be a singulation process previously described to define a plurality of second (base) portions. The second portion of the part is attached to the first portion. In some embodiments, a further step may be performed to remove the first coating. Also, in some embodiments, a lateral portion of the second portion may be coated, for example, with the same material used in the second coating.

Figure 14:
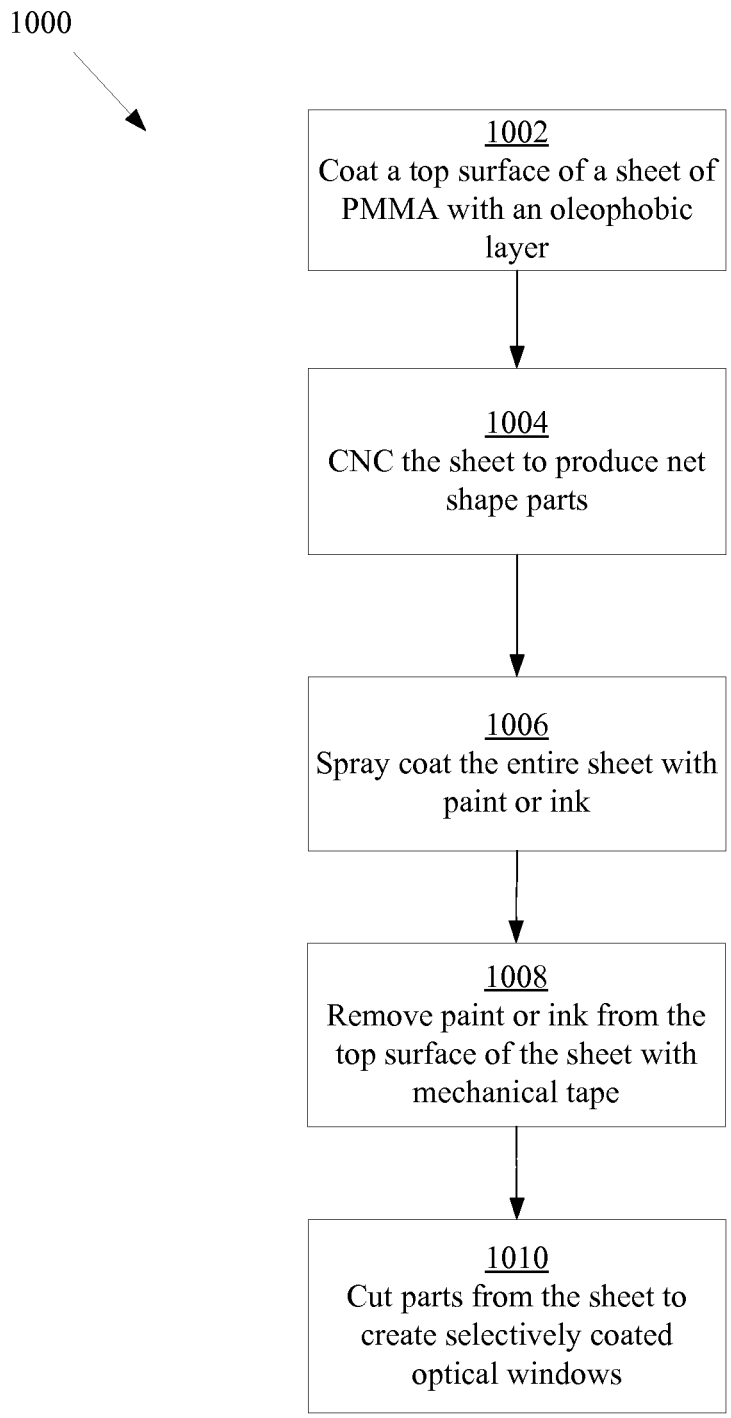
FIG. 14 shows a flowchart of a method of producing selectively coated optical windows for mobile devices.

FIG. 14 illustrates a flowchart 1000 describing a method of producing selectively coated optical windows for mobile devices. In step 1002, a top surface of a sheet of PMMA is coated with an oleophobic coating. Then in step 1004, a CNC mill machines the PMMA sheet to produce a net shape parts. Then in step 1006, the PMMA sheet is spray coated with paint or ink. Then in step 1008, the paint or ink is removed from the top surface with mechanical tape. Then in step 1010, the PMMA sheet is cut to form parts which are selectively coated individual optical windows for a mobile device.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic device having a housing and a light source carried by the housing, the electronic device comprising:
   a light window formed from a transparent material and disposed within an aperture of the housing and capable of receiving light from light source and covering the light source, the light window comprising:
      a base portion defining a light receiving end positioned to receive the light from the light source, and
      a cylindrical portion characterized as having a circular cross section and extending away from the base portion and defining a light transmission path along which the received light passes to a light transmission end that allows the light received by the light receiving end to exit the light window, the base portion extending beyond the circular cross section of the cylindrical portion; and a light block disposed on the light window, the light block comprising a reflective layer configured to reflect any of the light received by the light receiving end that is incident on the light block toward the light transmission end.

2. The electronic device of claim 1, wherein the light block further comprises a second layer deposited on the reflective layer, the second layer configured to absorb any of the light from the light source that passes through the reflective layer.

3. The electronic device of claim 2, wherein the reflective layer includes a first color and the second layer includes a second color different from the first color.

4. The electronic device of claim 2, wherein the second layer comprises an opaque layer.

5. The electronic device of claim 2, wherein:
the reflective layer has a first thickness;
the second layer has a second thickness; and
the first thickness is greater than the second thickness.

6. The electronic device of claim 2, wherein the reflective layer comprises a first paint, and wherein the second layer comprises a second paint different from the first paint.

7. The electronic device of claim 2, wherein the second layer comprises a material comprising at least one of ink or a polymeric material.

8. The electronic device of claim 1, wherein the base portion is perpendicular with respect to the cylindrical portion, and wherein the base portion is engaged with an interior surface of the housing.

9. The electronic device of claim 8, wherein the light block is disposed on only the cylindrical portion.

10. The electronic device of claim 8, wherein the light block is disposed on the base portion and the cylindrical portion.

11. The electronic device of claim 1, further comprising a reflector surrounding the light source.

12. The electronic device of claim 1, wherein the light source comprises a flash for use with a camera module.

13. The electronic device of claim 1, wherein the light window comprises an optically clear plastic.

14. An electronic device, comprising:
a housing that defines an internal cavity having an interior surface, the housing further comprising an aperture that opens to the internal cavity;
a light source disposed in the internal cavity and configured to emit light;
a light window formed from a transparent material disposed in the aperture to cover the light source and extending along the internal cavity, the transparent material comprising:
a cylindrical portion disposed in the aperture, and
a base portion extending beyond the cylindrical portion and into the internal cavity to engage with the interior surface, the transparent material configured to receive the light and pass the light through the aperture; and
a light altering layer disposed on an exterior surface of the transparent material in a location between the transparent material and the interior surface, the light altering layer comprising a reflective layer that reflects the light received by the transparent material to direct the light through the aperture.

15. The electronic device of claim 14, wherein the base portion defines a light receiving end to receive the from the light source, and wherein the cylindrical portion defines a light transmission end that allows the light received from the light receiving end to pass through the transparent material.

16. The electronic device of claim 14, wherein the cylindrical portion defines the exterior surface on which the light altering layer is disposed.

17. The electronic device of claim 14, wherein:
the transparent material comprises a cylindrical portion disposed in the aperture, and a base portion perpendicular with and extending beyond the cylindrical portion,
the light altering layer further comprises a light absorbing layer deposited on the reflective layer, and
the reflective layer and the light absorbing layer cover the cylindrical portion and the base portion.

18. The electronic device of claim 17, wherein the reflective layer and the light absorbing layer covering the base portion are positioned between the base portion and the interior surface.

19. The electronic device of claim 14, further comprising a reflector surrounding the light source.

* * * * *